UNITED STATES PATENT OFFICE.

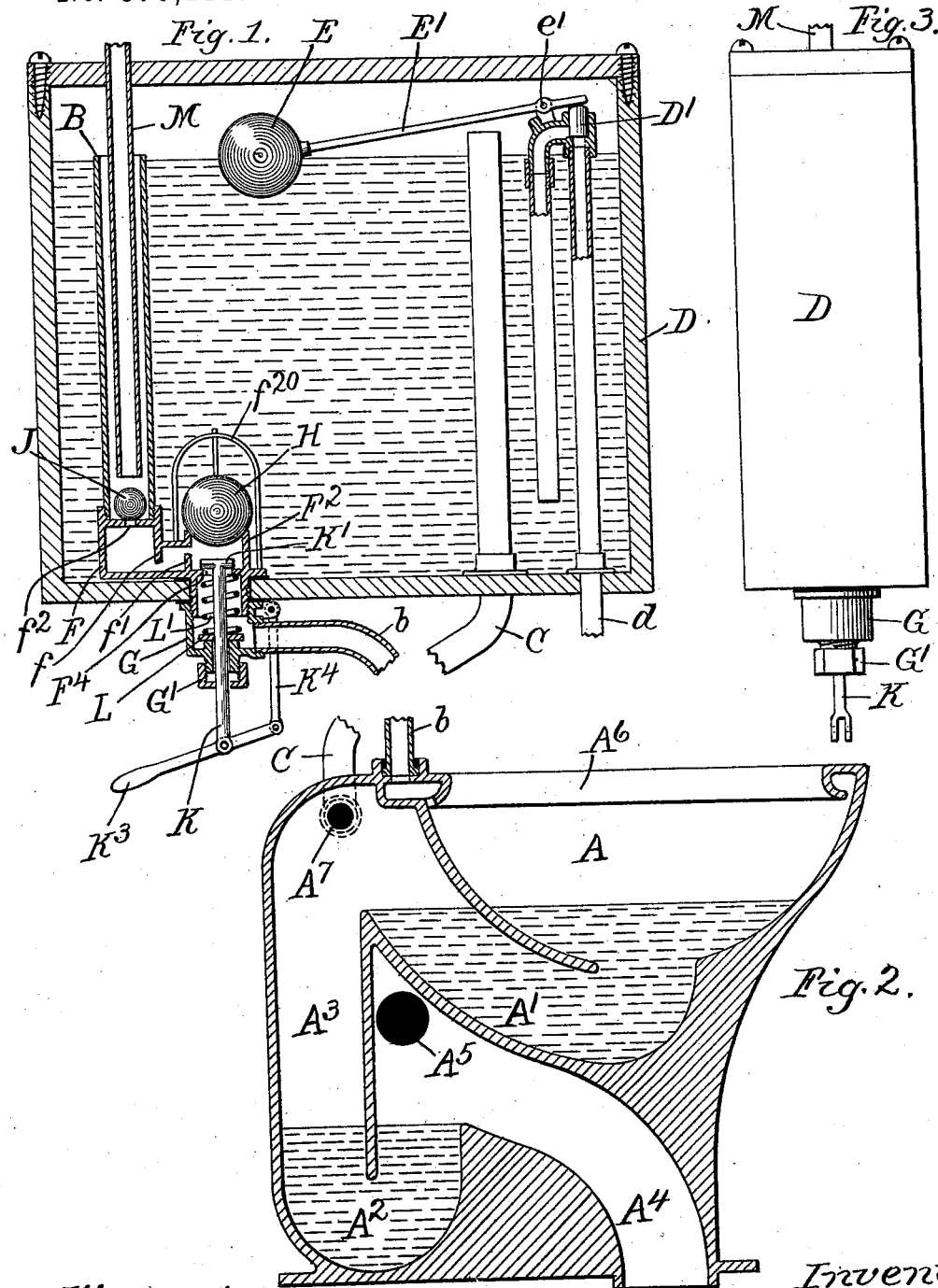

PATRICK HARVEY, OF CHICAGO, ILLINOIS.

CLOSET-OPERATING TANK AND VALVE.

SPECIFICATION forming part of Letters Patent No. 575,111, dated January 12, 1897.

Application filed February 20, 1896. Serial No. 580,093. (No model.)

*To all whom it may concern:*

Be it known that I, PATRICK HARVEY, a citizen of the United States, residing at Chicago, county of Cook, and State of Illinois, have invented certain new and useful Improvements in a Closet-Operating Tank and Valve, which are fully set forth in the following specification, reference being had to the accompanying drawings, forming a part thereof.

The purpose of this invention is to provide a simplified structure of a tank for operating a water-closet adapted to operate a siphon-closet or one having two traps and requiring rarefication of the air between the traps to cause it to be evacuated by siphonic action, the structure of the tank being such as to not require great elevation above the closet, but adapted to operate when located only just sufficiently above the level of the closet to cause the water to flow from it into the latter. The structure is such that the air is drawn from between the traps and is not discharged back through the closet into the room, but is drawn off through the ventilating-pipe.

In the drawings, Figure 1 is a vertical section through the tank and its valves and water and air passages. Fig. 2 is a vertical section through the closet-bowl in a plane at right angles to the plane of the section through the tank in Fig. 1. Fig. 3 is an edge elevation of the tank, showing by comparison with Fig. 2 the relative fore-and-aft dimensions of the tank and closet-bowl, and indicating that the tank may be located on the wall at the rear of the bowl in the usual space allowed for the seat-fixtures.

The bowl A is in general of the customary form, having an upper trap $A'$, lower trap $A^2$, intervening air-space $A^3$, discharge-outlet $A^4$, ventilating connections $A^5$, flushing-rim $A^6$, entered by the flushing-pipe $b$, air-exhaust connections $A^7$, entered by the air-exhaust pipe C.

D is the tank, which is an air-tight compartment.

$d$ is the supply-pipe, leading thereinto, the discharge being controlled by a check-valve $D'$, adapted to be opened by the water and to be held upon its seat by the arm $E'$, fulcrumed at $e'$ on the pipe $d$ and carrying the float E in a manner which will be understood from the drawings without further explanation.

C is the air-exhaust pipe, which extends from its connections with the closet at $A^7$ up through the bottom of the tank to a point near the top, where it is open above the water-line. The water-line is determined by the height of the overflow-pipe B, which terminates open at its upper end below the level of the upper end of the pipe C. The overflow-pipe B is connected at the lower end to the fitting F, which is located within the tank and secured to the bottom thereof by means of the outlet nipple or spud $F'$, which is inserted through the bottom and bound fast thereto by the fitting G, screwed onto the lower protruding end of said spud or nipple $F'$. The fitting F has the outlet-valve seat $F^2$, above which a cage $f^{20}$ retains the float-valve H, adapted to close the outlet through said seat $F^2$. A downwardly-projecting wing $f$ and an upwardly-projecting wing $f'$ in the chamber of the fitting F form a trap between the valve H and the orifice $f^2$, which is located centrally with regard to the overflow-pipe B, and for the purpose of communicating with such pipe a small float-valve J is located within the overflow-pipe B, adapted to seat above said orifice $f^2$.

The valve H is designed to be pushed off its seat by the plunger K, which extends up through the stuffing-box $G'$ at the lower end of the fitting G and thence up through the nipple or spud $F'$ of the fitting F, said plunger having at its upper end a head or flange $K'$, adapted to push against the float-valve H and lift it off its seat. To retain the plunger in its place, the fitting F has a small flange $F^4$, projecting inwardly about the margin of the outlet-aperture below the valve leading through the spud $F'$, on which flange the head $K'$ hangs.

$K^3$ is a lever-arm fulcrumed at the end of the link $K^4$, which is pivotally suspended from the fitting G, said lever-arm being pivotally connected to the flange K and adapted to operate the latter when the lever-arm is operated by hand, its position in use being alongside the closet-seat or about the level of the latter. The boss to which the stuffing-box $G'$ is secured on the outside of the fitting $F'$ extends inwardly, and at its upper inner end there is seated a rubber gasket L, which is held on said seat by a spring $L'$, which rests against the under side of the flange F⁴. The purpose of this is to cause any leakage which may escape around the valve H to flow out through the pipe $b$ without danger of soaking through the packing of the stuffing-box G', this result being obtained by the upper projection of the boss on which the gasket L is seated, because the overflow will not in any ordinary case be sufficient to cause the water to stand at the bottom of the fitting G deeper than the height of said boss.

M is an air-pipe for ventilation, which extends down through the top of the tank and into the upper open end of the overflow-pipe B, terminating at the lower end, open a short distance above the float-valve J when the latter is on its seat over the orifice $f^2$.

The operation of this device is as follows: The tank being full to the top of the overflow-pipe B, the valve H being on its seat, the valve J seated over the orifice $f^2$, there will be no water in the overflow-pipe B above the valve J, but water will stand in the trap $ff'$ in the fitting F. When the operator by means of the lever K³ pushes the valve H off its seat, it will float immediately to the top of the cage. The water flowing through such seat, the aperture in which is larger than the cross-section of the pipe $b$, will back up through the trap $ff'$ and through the orifice $f^2$, floating the valve J up against the pipe M, the water then continuing to rise in the pipe B outside the air-pipe M to the level to which by that time it may have fallen in the remainder of the tank outside the pipe B. The water will continue to drain from the tank, falling simultaneous in the pipe B and outside of said pipe and producing a suction of air up through the pipe C, rarefying the air between the traps of the closet and inducing the discharge action of the latter, which will continue so long as the water continues to fall in the tank without opportunity to drain the air from any other source than through the pipe C. Such is the case until the water has fallen below the level at which it can sustain the float-valve J up against the lower end of the air-pipe M. As soon as the water-level falls low enough to allow this float-valve to leave the end of the pipe M the air, entering through the pipe M and passing up around the same and out through the top of the pipe B, supplies the partial vacuum therefor created by the falling of the water and breaks the siphon in the closet-bowl, terminating the siphonic action therein. The valve H being still off its seat, the two valves H and J being so located that the latter leaves the pipe M some time before the water is low enough to seat the former, the remaining water discharged before the valve H seats serves as a refill or afterwash for the closet. When the level of the water in the tank has fallen far enough to reseat the valve H, the refilling of the tank through the pipe B proceeds; but no water can pass into the pipe B nor rise through the orifice $f^2$, because the valve H closes the only avenue through which water can enter under the valve J. The valve J therefore remains seated over the orifice $f^2$, leaving the lower end of the pipe open, so that as the water rises in the tank the air above it will be forced out, passing down through the pipe B and up through the ventilating-pipe M. Thus the air taken from between the traps is passed out of the building and not back through the closet into the room. The valve J might be dispensed with but for the liability which would then arise that the outflow through the pipe B would siphon out the trap $ff'$. Such siphonage, it is true, may be prevented by other means, but the valve J is a convenient expedient.

I claim—

1. In combination with an air-tight closet-tank, the discharge-passage and the flushing-valve which controls the same, an overflow-passage communicating with the discharge-passage below the valve-seat, an air-exhaust pipe leading from the top of the tank, a ventilating-pipe opening in the overflow-passage at a point sufficiently above the water-level at which the flushing-valve seats to allow for the refill or afterwash.

2. In combination with an air-tight closet-tank, the discharge-passage thereto and valve which controls such passage, an air-exhaust pipe, and an overflow-pipe having communication with the discharge-passage beyond the valve, and the ventilating-pipe extending air-tight through the tank-wall and down into the overflow-pipe and terminating open therein above the water-level at which the valve seats.

3. In combination with an air-tight closet-tank, the flushing-valve and the discharge-passage beyond it; an air-exhaust pipe; an overflow-pipe communicating at the lower end with such discharge-passage; a trap interposed between the discharge-passage and the overflow-pipe, and the ventilating-pipe opening in the overflow-passage at a point above the water-level at which the flushing-valve seats.

4. In combination with an air-tight closet-tank, the discharge-pipe leading therefrom and the flushing-valve controlling the same, an air-exhaust pipe, the overflow-pipe communicating with the discharge-passage beyond the flushing-valve, a trapped chamber interposed between the overflow-pipe and the discharge-passage, a float-valve seating downwardly to close the orifice of communication between the overflow-pipe and said trapped chamber, and the vent-pipe opening into the overflow-pipe above said orifice.

5. In combination with an air-tight closet-tank, the discharge-passage leading therefrom, the flushing-valve controlling such passage, an air-exhaust pipe; the overflow-pipe communicating with the discharge-passage beyond the valve-seat; a float-valve adapted when seated to close communication between the overflow-pipe and the discharge-passage;

a ventilating-pipe terminating downwardly open above such float-valve and adapted to be closed by the latter when it is floated off its seat at the communication between the overflow and discharge passage.

In testimony whereof I have hereunto set my hand, in the presence of two witnesses, at Chicago, Illinois, this 18th day of February, 1896.

PATRICK HARVEY.

Witnesses:
 CHAS. S. BURTON,
 JEAN ELLIOTT.